United States Patent Office

2,879,311
Patented Mar. 24, 1959

2,879,311

DEHYDROCHLORINATION OF TRICHLOROBUTANE

Edwin George Edward Hawkins, Lower Kingswood, Tadworth, England, assignor to The Distillers Company Limited, Edinburgh, Scotland, a British company No Drawing. Application July 18, 1956
Serial No. 598,518

Claims priority, application Great Britain August 5, 1955

5 Claims. (Cl. 260—654)

The present invention relates to the production of chloroprene (2-chlorobutadiene) and hydrogen chloride using as starting materials chlorine and a straight chain hydrocarbon containing four carbon atoms such as butene-1, butene-2 or butane. In particular it relates to the production of chloroprene precursors and hydrogen chloride by the dehydrochlorination of 1:2:3-trichlorobutane. This compound is obtainable from butene-1, butene-2 or butane by chlorination.

Various processes have been proposed for the production of chloroprene and hydrogen chloride from various chlorinated derivatives of butane or the butenes, notably by the pyrolysis of 2:2:3-trichlorobutane and of certain dichlorobutenes. One of the difficulties of such processes has been that initial chlorination of the straight chain hydrocarbon gives rise to chlorinated products which cannot by pyrolysis be converted, or are only converted in small yield, to chloroprene and hydrogen chloride. For instance, the chlorination of butene-2 to produce trichlorobutanes gives rise to 1:2:3-trichlorobutane as well as the desired 2:2:3-trichlorobutane and the chlorination of butene-1 to a trichlorobutane gives as chief product the 1:2:3-isomer. Similarly the direct chlorination of butane gives rise to mixed trichlorobutanes. 1:2:3-trichlorobutane has not previously been converted economically to chloroprene because, although on pyrolysis it gives some chloroprene, it also produces unwanted 1-chlorobutadiene.

An object of the present invention is to provide a process whereby 1:2:3-trichlorobutane can be converted into chloroprene precursors. By the term "chloroprene precursor" is meant throughout this specification a chlorine derivative of the butenes which, on pyrolysis or isomerisation followed by pyrolysis, gives primarily chloroprene and very little unwanted 1-chlorobutadiene. A further object of the invention is to provide a method for converting 1:2:3-trichlorobutane into chloroprene and hydrogen chloride with the minimum formation of unwanted by-products. Another object of the invention is to provide a process, the use of which can improve overall yield of chloroprene from trichlorobutanes obtained by the chlorination of butene-1, butene-2 or butane.

Accordingly, the present invention is a process for the conversion of 1:2:3-trichlorobutane into hydrogen chloride and chloroprene precursors, which comprises heating the trichlorobutane in the presence as catalyst of the hydrochloride or a quaternary ammonium chloride salt of an amine having a pK value in the range 3.0 to 9.0 and a boiling point at atmospheric pressure between 110 and 250° C.

Pure 1:2:3-trichlorobutane can be used in the process of the present invention but equally well the reaction can be carried out using as starting material a mixture of isomeric trichlorobutanes.

A wide variety of amine hydrochlorides or quaternary ammonium chloride salts can be used to catalyze the dehydrochlorination reaction provided that the amines from which they are derived have the characteristics stated above. Tertiary amines give rise to particularly good catalysts. Preferred catalysts are derived from alpha- and gamma-picolines, 2:4:6-collidine, 5-ethyl-2-methylpyridine and tri-n-butylamine. Other suitable amines include pyridine, quinoline, N-ethylpiperidine and cyclohexylamine. The amine hydrochlorides are the preferred catalysts.

The amine hydrochlorides or the quaternary ammonium chloride salts act as true catalysts in the process of the present invention and each molecular proportion of catalyst effects the dehydrochlorination of many molecular proportions of 1:2:3-trichlorobutane. The process of the present invention can be carried out by adding a suitable amine to the reaction mixture. The amine effects the dehydrochlorination reaction but no free hydrogen chloride is given off until a sufficient quantity of hydrogen chloride has been produced to convert the amine into its hydrochloride. It should be noted that many amines can effect the stoichiometric dehydrochlorination of 1:2:3-trichlorobutane but, surprisingly, it has been found that, unless they have the characteristics of the amines of the present invention, their formed hydrochlorides do not catalyze the production of free hydrogen chloride and chloroprene precursors.

The catalytic dehydrochlorination reaction of the present invention is effected by heating the reaction mixture, preferably to a temperature above 150° C. It is often convenient to carry out the reaction by heating the reaction mixture under reflux and consequently, under atmospheric pressure, a temperature in the range 150 to 220° C. or above may suitably be employed. The rate of reaction is increased by raising the temperature. As the temperature of the reaction mixture is increased, it may become necessary to raise the pressure in the reaction system so that part at least of the reacting material is maintained in the liquid phase. If desired, an inert solvent for 1:2:3-trichlorobutane and/or the catalyst can be employed. The solvent should preferably have a sufficiently high boiling point to prevent it being distilled out of the reaction mixture during the process. Examples of suitable solvents are diphenyl ether and chloronaphthalene.

The rate of the dehydrochlorination is partly dependent on the amount of catalyst used and consequently this amount may be varied accordingly. It is often advantageous to add a high proportion of catalyst, for instance 25% or 50% by weight or more, to the initial reaction mixture in order to obtain a suitably fast rate of reaction. As the produced dichlorobutenes are distilled from the reaction mixture and the trichlorobutane consumed, further quantities of trichlorobutane may be added to take its place and keep the volume of the reaction mixture approximately constant.

The process of the present invention may be carried out batchwise or continuously. A suitable apparatus for continuous working consists of a fractionating column above a heated reaction vessel which can be charged with a mixture of 1:2:3-trichlorobutane and the amine catalyst. The mixture is boiled so that it refluxes in the column, and gaseous hydrogen chloride is separated from the liquid reflux in the stillhead at the top of the column and led away. When the head temperature falls to a point near the boiling-point of the produced dichlorobutenes, suitably about 125° C, a part of the reflux is bled off as product at such a rate that the head temperature does not rise above a value predetermined by the degree of conversion required. The control of the rate of take-off may be manual or by means of an automatic device operated by a temperature-sensitive element in the stillhead. Simultaneously, 1:2:3-trichlorobutane is pumped into the reaction vessel at such a rate that the volume of its contents remains approximately constant. An alternative and preferred arrangement is to lead the vapours from the reaction vessel into the column at a point several plates above the base. A reboiler at the base of the column is then necessary to maintain reflux in the lower part. The excess liquid in the reboiler, which will be mainly unchanged trichlorobutane, is returned to the reaction vessel by means of a pumping or overflow device. A certain amount of polymer may form in the reaction vessel after a long period of running, and to eliminate this and any other undesirable substances which may accumulate in the reaction mixture, it is desirable to draw off intermittently or continuously a proportion of the liquid, recovering therefrom trichlorobutane, dichlorobutenes and the catalyst and returning them to the reaction vessel while rejecting the residual material. Any amine lost during the above processes is replaced so as to maintain the desired concentration of catalyst in the reaction mixture.

The dehydrochlorination reaction of the present invention produces dichlorobutenes and surprisingly it has been found that substantially no dichlorobutenes are produced which, on pyrolysis, give 1-chlorobutadiene. The chief products of the dehydrochlorination of 1:2:3-trichlorobutane under the conditions of the present invention are 1:2-dichlorobutene-2, and 2:3-dichlorobutene-1 with, in some cases, minor amounts of 1:3-dichlorobutene-2. These compounds have lower boiling points than the trichlorobutane and consequently, as they are formed, they can be distilled from the reaction mixture or taken from the top of a reaction zone fitted with a reflux condenser or column. Dichlorobutenes which give 1-chlorobutadiene on pyrolysis, for example, 1:3-dichlorobutene-1 and 3:4-dichlorobutene-1 are surprisingly substantially absent from the product of the present invention.

The gaseous hydrogen chloride formed in the reaction may be recovered by any suitable means. An advantage of the present invention is that the hydrogen chloride is produced in substantially anhydrous form.

The present invention provides a reaction which is particularly useful when applied to the production of chloroprene from butene-1 or butene-2. These butenes can be converted by chlorination into trichlorobutanes as a first step in the production of chloroprene. For example butene-1 gives rise to 1:2:3-trichlorobutane which can be converted by the process of the present invention into hydrogen chloride and dichlorobutenes which can then be converted in known manner to chloroprene and more hydrogen chloride.

Butene-2 on chlorination gives rise to a mixture of 2:2:3-trichlorobutane and 1:2:3-trichlorobutane. The latter is treated according to the present invention, while the former may be converted in known manner directly into chloroprene and hydrogen chloride.

The chlorination of butenes to give trichlorobutanes is known. In practice it is advantageous, particularly when the chlorination is to be carried out continuously, to chlorinate to an average chlorine content less than that required for complete conversion and then to distil the product continuously and return the lower boiling dichlorobutanes to the chlorination reactor. In this way mixtures of trichlorobutanes substantially free from over-chlorinated products are obtained. It is particularly desirable to prevent so far as is possible the formation of 2:2:3:3-tetrachlorobutane. This compound is difficult to separate from 1:2:3-trichlorobutane by distillation and is stable under the conditions of the present invention. It is a solid up to 180° C. and consequently it is liable to cause blockages inside the apparatus, particularly if it is allowed to accumulate when operating the process continuously. It can be separated from 1:2:3-trichlorobutane by treatment with thiourea according to copending British application No. 31,855/55.

The mixtures consisting essentially of 2:2:3-trichlorobutane and 1:2:3-trichlorobutane obtained by the chlorination of butene-2 is readily separated into its components by distillation and the two components treated separately as outlined above. It is possible to react 1:2:3-trichlorobutane according to the present invention in the presence of 2:2:3-trichlorobutane, some of which will be recovered from the reaction mixture unchanged. However, some of the 2:2:3-trichlorobutane will be converted into 2:3-dichlorobutene-2 which is stated not to pyrolyse to give chloroprene. It is therefore somewhat wasteful to subject 1:2:3-trichlorobutane to the process of the present invention when it is present in a crude chlorination reaction mixture containing a substantial amount of 2:2:3-trichlorobutane.

The present invention gives rise to a mixture of 1:2-dichlorobutene-2, 2:3-dichlorobutene-1 and minor amounts of 1:3-dichlorobutene-2 all of which, on subsequent pyrolysis, are converted in known manner to hydrogen chloride and chloroprene substantially free from 1-chlorobutadiene. According to the prior art 2:3-dichlorobutene-1 gives a greater yield of chloroprene on pyrolysis than do the other dichlorobutenes formed by the process of the present invention. The ultimate yield of chloroprene may therefore be increased by isomerising the 1:2-dichlorobutene-2 to 2:3-dichlorobutene-1. This isomerisation may be carried out under the action of heat alone, i. e. under pyrolysis conditions, or under the influence of copper or a copper chloride catalyst under reflux conditions.

The conversion of the above mentioned dichlorobutenes into chloroprene can be effected in known manner by, for instance, subjecting them to uncatalysed pyrolysis at 450–650° C. (preferably 500–530° C.).

The following examples illustrate the conversion of 1:2:3-trichlorobutane into dichlorobutenes according to the present invention. The parts given are by weight.

EXAMPLE 1

25 parts of 1:2:3-trichlorobutane and 4.5 parts of quinoline (pK 8.8; B.P. 238° C.) were added to a reaction vessel fitted with a packed reflux column having an outlet at the top for low boiling products. The mixture was heated under reflux, the temperature of the bath surrounding the reaction vessel increasing from 180° to 220° C. and 16.7 parts of liquid product were slowly taken off at the top of the column. During the same period 4.7 parts of free hydrogen chloride were obtained. The product was washed free from hydrogen chloride and was fractionated according to boiling range and analyzed by infra-red spectrum analysis for dichlorobutenes (DCB). The results are given in Table 1.

Table 1

| Fraction | Boiling Range | Weight | Approximate Composition |
|---|---|---|---|
| 1 | 95–114 | 2.2 | 90% 2:3-DCB-1; 5% 1:2-DCB-2. |
| 2 | 114–120 | 3.3 | 85% 2:3-DCB-1; 10–15% 1:2-DCB-2. |
| 3 | 120–127 | 3.0 | 50% 2:3-DCB-1; 50% 1:2-DCB-2. |
| 4 | 127–132 | 3.7 | 85% 1:2-DCB-2; 5% 2:3-DCB-1. |
| 5 | 132–150 | 1.0 | 80% 1:2-DCB-2. |
| Residue | | 1.3 | |

EXAMPLE 2

The process of Example 1 was repeated but the quinoline was replaced with 4 parts of N-ethylpiperidine (pK 3.0; B.P. 131° C.). 18.3 parts of product and 4 parts of hydrogen chloride were produced and the former was washed, fractionated and analyzed as before. The results are given in Table 2.

*Table 2*

| Fraction | Boiling Range | Weight | Approximate Composition |
|---|---|---|---|
| 1 | 105–116 | 0.5 | 70% 2:3-DCB-1; 30% 1:2-DCB-2. |
| 2 | 116–123 | 3.1 | 75% 2:3-DCB-1; 25% 1-2-DCB-2. |
| 3 | 123–130.5 | 6.5 | 60% 1:2-DCB-2; 15% 2:3-DCB-1; 25% 1:3-DCB-2. |
| 4 | 130.5–140 | 2.8 | 75% 1:2-DCB-2; 25% 1:3-DCB-2. |
| Residue | | 1.5 | |

EXAMPLE 3

25 parts of a sample of 1:2:3-trichlorobutane containing some 2:2:3:3-tetrachlorobutane (TCB) were treated as in Example 1 with 5 parts of pyridine hydrochloride (pyridine has a pK value of 8.6 and B.P of 115° C.) in place of the quinoline. 15.1 parts of product were obtained together with 5 parts of hydrogen chloride. The product was washed, fractionated and analyzed as before. The results are given in Table 3.

*Table 3*

| Fraction | Boiling Range | Weight | Approximate Composition |
|---|---|---|---|
| 1 | 106–140 | 9.2 | 60% 1:2-DCB-2; 40% 2:3-DCB-1. |
| 2 | 140–160 | 2.6 | 50% 1:2-DCB-2; 20% 2:2:3:3-TCB.[1] |
| Residue | | 0.6 | |

[1] Unreacted material present in starting mixture.

EXAMPLE 4

A mixture containing 15 parts of 1:2:3-trichlorobutane and 13.5 parts of 2:2:3-trichlorobutane was heated with 5 parts of quinoline as described in Example 1. The final reaction temperature was about 240° C. 20.9 parts of product were obtained together with 2.56 parts of acid. On washing and redistillation the product analyzed as shown in Table 4.

*Table 4*

| Fraction | Boiling Range | Weight | Approximate Composition |
|---|---|---|---|
| 1 | 97–110 | 2.7 | 70% 2:3-DCB-2; 30% 2:3-DCB-1. |
| 2 | 110–135 | 9.2 | 40% 1:2-DCB-2; 30% 2:3-DCB-2 and 30% 2:2:3-trichlorobutane. |
| 3 | 135–142 | 6.6 | 80% 2:2:3-trichlorobutane; 20% 1:2-DCB-2. |
| Residue | | 2.0 | |

EXAMPLE 5

100 parts of a sample of 1:2:3-trichlorobutane containing 5% of 1:2:3:4-tetrachlorobutane was treated as in Example 1 with 24 parts of commercial sym. collidine (pK 6.9; B.P. 172° C.). 58 parts of liquid product and 10.9 parts of hydrogen chloride were obtained, the head temperature being kept below 130° C. throughout and the temperature of the reaction mixture being between 155 and 175° C. The product consisted of approximately 40% of 1:2-dichlorobutene-2 and 60% of 2:3-dichlorobutene-1.

EXAMPLE 6

100 parts of 1:2:3-trichlorobutane containing 10% of 2:2:3:3-tetrachlorobutane were treated as in Example 1 with 25 parts of cyclohexylamine (pK 3.4; B.P. 134° C.). 58 parts of liquid product and 17.1 parts of hydrogen chloride were obtained, the head temperature being kept below 125° C. while the temperature of the reaction mixture rose from 175° to 240° C. The product contained approximately 10% of unchanged trichlorobutane, 40% of 1:2-dichlorobutane-2, and 50% of 2:3-dichlorobutene-1.

EXAMPLE 7

An electrically heated reaction vessel at the base of a packed distillation column equivalent to about 8 theoretical plates, was charged with 200 parts of pure 1:2:3-trichlorobutane and 100 parts of tributylamine hydrochloride (tributylamine has a pK value of 3.2 and a B.P. of 214° C.). The mixture was boiled under reflux, and a portion of the reflux was removed as product from the head of the column by means of a device controlled by a temperature-sensitive element in the stillhead, at such a rate that the head temperature did not rise above 127° C. Simultaneously, pure 1:2:3-trichlorobutane was pumped into the reaction vessel at a rate sufficient to keep the volume of its contents constant. The temperature of the boiling reaction mixture was 168°–170° C. A total of 13.780 parts of trichlorobutane was fed in during 197 hours, and 10,584 parts of liquid product and 2960 parts of hydrogen chloride were obtained. The percentage composition of the product was as follows:

|  | Percent |
|---|---|
| 1:2-dichlorobutene-2 | 48 |
| 2:3-dichlorobutene-1 | 25 |
| 1:3-dichlorobutene-2 | 13 |
| 3:4-dichlorobutene-1 | 2.4 |
| Other dichlorobutenes | 5.8 |
| 1-chlorobutadiene | 0.4 |
| Chloroprene | 0.2 |
| Unchanged trichlorobutane | 5.2 |

From the residue in the reaction vessel, 64% of the tributylamine used was recovered.

EXAMPLE 8

An electrically-heated reaction vessel communicated through a vapour pipe with the mid-point of a fractionating column equivalent to approximately 8 plates above and 8 plates below the midpoint. The head of the column was fitted with a take-off device as described in Example 7. The base of the column was provided with a small reboiler with an overflow leading back to the reaction vessel. The reaction vessel was charged with 214 parts of pure 1:2:3-trichlorobutane and 100 parts of α-picoline hydrochloride (α-picoline has a pK value of 8.1 and a B.P. of 128° C.), and the reboiler was charged with 125 parts of 1:2:3-trichlorobutane. Heating was applied so that the column operated in a stable manner, and product was taken off as in Example 7. In 108 hours, a total of 10,227 parts of pure trichlorobutane was fed into the reaction vessel and 7693 parts of liquid product and 2205 parts of hydrogen chloride were obtained. The percentage composition of the product was as follows:

|  | Percent |
|---|---|
| 1:2-dichlorobutane-2 | 48 |
| 2:3-dichlorobutene-1 | 21 |
| 1:3-dichlorobutene-2 | 12 |
| 3:4-dichlorobutene-1 | 3 |
| Other dichlorobutenes | 9 |
| 1-chlorobutadiene | 0.4 |
| Chloroprene | 0.4 |
| Unchanged trichlorobutane | 7 |

EXAMPLE 9

A reaction vessel was fitted with a short unpacked column with reflux condenser and outlet for product. The vessel was charged with a mixture of 127 parts of 1:2:3-trichlorobutane, 23 parts of 2:2:3:3-tetrachlorobutane, and 50 parts of α-picoline. The mixture was boiled, and when hydrogen chloride began to be evolved a proportion of the liquid reflux was removed as product at such a rate that the stillhead temperature was kept at 140–145° C., whilst the temperature of the reaction mixture fluctuated between 150° C. and 160° C. Simultaneously, a feedstock consisting of crude 1:2:3-trichlorobutane containing an average of 17% of 2:2:3:3-tetrachlorobutane was added to the reaction vessel at such a rate as to keep the volume of its contents constant. A total of 5323 parts of feedstock was added in the course of 187 hours, and 4406 parts of liquid product and 879 parts of hydrogen chloride were obtained. The product had the following percentage composition:

| | Percent |
|---|---|
| 1:2-dichlorobutene-2 | 27 |
| 2:3-dichlorobutene-1 | 18 |
| 1:3-dichlorobutene-2 | 5 |
| 1:3-dichlorobutene-1 | 0.2 |
| Chloroprene | 0.5 |
| Unchanged 1:2:3-trichlorobutane | 24 |
| Unchanged 2:2:3:3-tetrachlorobutane (the rest being unidentified) | 18 |

The dichlorobutenes were easily separated from tri- and tetra-chlorobutane by distillation. The major part of the tetrachlorobutane crystallized from the higher fractions of the distillate and was removed, after which the liquid phase consisting of trichlorobutane saturated with tetrachlorobutane could be re-used.

EXAMPLE 10

100 parts of 1:2:3-trichlorobutane (containing 5% of 2:2:3:3-tetrachlorobutane) were treated as in Example 1 with 25 parts of gamma-picoline (pK 7.8, B.P. 143° C.). 62 parts of liquid product, collected at a head temperature below 130° C., and 14.2 parts of hydrogen chloride were obtained. The temperature of the reaction mixture was from 131° to 220° C. The liquid product consisted of approximately equal proportions of 1:2-dichlorobutene-2 and 2:3-dichlorobutene-1.

EXAMPLE 11

100 parts of 1:2:3-trichlorobutane were treated as in Example 1 with 25 parts of 5-ethyl-2-methylpyridine (B.P. 174° C.). 62 parts of liquid product were obtained which consisted of approximately 60% of 2:3-dichlorobutene-1, 25% of 1:2-dichlorobutene-2, 5% of chloroprene, and 10% of unchanged trichlorobutane.

EXAMPLE 12

100 parts of pure 1:2:3-trichlorobutane were treated as in Example 1 with 25 parts of 1-methylpyridinium chloride. 60 parts of liquid product and 11.3 parts of hydrogen chloride were obtained, the head temperature being kept below 120° C. The product had the following composition:

| | Percent |
|---|---|
| 1:2-dichlorobutene-2 | 47 |
| 2:3-dichlorobutene-1 | 20 |
| 1:3-dichlorobutene-2 | 6 |
| 3:4-dichlorobutene-1 | 0.5 |
| Chloroprene | 1.8 |
| 1-chlorobutadiene | 0.5 |
| Unchanged 1:2:3-trichlorobutane | 17 |
| (the rest being unidentified) | |

In the claims the expression "the hydrochlorides and quaternary ammonium chloride salts of an amine having a pK value in the range 3.0 to 9.0 and a boiling point at atmospheric pressure between 110° C. and 250° C." designates not only said hydrochlorides and ammonium salts but also amines per se having a pK value and the boiling point mentioned. These amines as hereinbefore stated are converted into the corresponding hydrochlorides, when added to the reaction mixture.

I claim:

1. A process which comprises heating 1:2:3-trichlorobutane in the presence of a catalyst selected from the group consisting of the hydrochlorides and quaternary ammonium chloride salts of an amine having a pK value in the range 3.0 to 9.0 and a boiling point at atmospheric pressure between 110° C. and 250° C.

2. A process as claimed in claim 1, wherein the amine is a tertiary amine.

3. A process as claimed in claim 1, wherein the amine is selected from the group consisting of alpha- and gamma-picoline, 2:4:6-collidine, 5-ethyl-2-methylpyridine and tri-n-butylamine.

4. A process as claimed in claim 1, wherein the reaction is carried out at a temperature in the range of 150° to 220° C.

5. A process as claimed in claim 1, wherein the reaction mixture contains at least 25% by weight of catalyst and the reaction is carried out continuously by withdrawing product and adding fresh 1:2:3-trichlorobutane to the reaction mixture at such a rate as to keep its volume approximately constant.

References Cited in the file of this patent

UNITED STATES PATENTS

| 1,998,442 | Carothers et al. | Apr. 23, 1935 |
| 2,038,538 | Carothers | Apr. 28, 1936 |
| 2,180,115 | Lange et al. | Nov. 14, 1939 |
| 2,361,072 | Vining | Oct. 24, 1944 |
| 2,524,383 | Hearne et al. | Oct. 3, 1950 |

FOREIGN PATENTS

| 497,941 | Canada | Nov. 24, 1953 |